(12) United States Patent
Tsang et al.

(10) Patent No.: US 10,734,625 B2
(45) Date of Patent: Aug. 4, 2020

(54) BATTERY INCLUDING SAFETY VENT ASSEMBLY

(71) Applicant: GP BATTERIES INTERNATIONAL LIMITED, Hong Kong (HK)

(72) Inventors: Hing Po Tsang, Hong Kong (CN); Sek Yin Sham, Hong Kong (CN)

(73) Assignee: GP BATTERIES INTERNATIONAL LIMITED, Hong Kong (HK)

( * ) Notice: Subject to any disclaimer, the term of this patent is extended or adjusted under 35 U.S.C. 154(b) by 516 days.

(21) Appl. No.: 15/744,850

(22) PCT Filed: Oct. 19, 2015

(86) PCT No.: PCT/IB2015/058024
§ 371 (c)(1),
(2) Date: Jan. 15, 2018

(87) PCT Pub. No.: WO2016/059618
PCT Pub. Date: Apr. 21, 2016

(65) Prior Publication Data
US 2018/0159101 A1    Jun. 7, 2018

(30) Foreign Application Priority Data

Oct. 17, 2014  (HK) ..................................... 14110414
Jul. 21, 2015  (HK) ..................................... 15106963

(51) Int. Cl.
*H01M 2/12*    (2006.01)
*H01M 2/02*    (2006.01)
(Continued)

(52) U.S. Cl.
CPC ......... *H01M 2/1282* (2013.01); *H01M 2/022* (2013.01); *H01M 2/046* (2013.01);
(Continued)

(58) Field of Classification Search
CPC .. H01M 2/1282; H01M 2/022; H01M 2/0413; H01M 2/046; H01M 2/1235; H01M 2/1264; H01M 2/34
(Continued)

(56) References Cited

U.S. PATENT DOCUMENTS 3,939,011 A      2/1976  Zaleski
4,745,039 A  *   5/1988  Yoshinaka .......... H01M 2/1229
                                                    429/54
(Continued)

FOREIGN PATENT DOCUMENTS

EP       0125037 A1    11/1984
JP       06325742 A  * 11/1994  .......... H01M 2/1229
(Continued)

OTHER PUBLICATIONS

International Search Report of PCT Patent Application No. PCT/IB2015/058024 dated Jan. 27, 2016.
(Continued)

*Primary Examiner* — Sean P Cullen
(74) *Attorney, Agent, or Firm* — Idea Intellectual Limited; Margaret A. Burke; Sam T. Yip

(57) ABSTRACT

A battery (10) comprises a safety vent assembly (100). The safety vent assembly (100) comprises a sealing member (104) and an urging member (106) to urge the sealing member (104) against a venting aperture (105) on a battery reaction chamber to seal the battery reaction chamber when pressure inside the battery reaction chamber is below a venting threshold pressure under normal operation conditions, wherein the sealing member (104) is operable to provide a venting path to vent gas from the battery chamber when pressure inside the battery chamber reaches the venting threshold pressure which is sufficient to overcome the urging force of the sealing member (104), and wherein the
(Continued)

Figures 1, 2A:
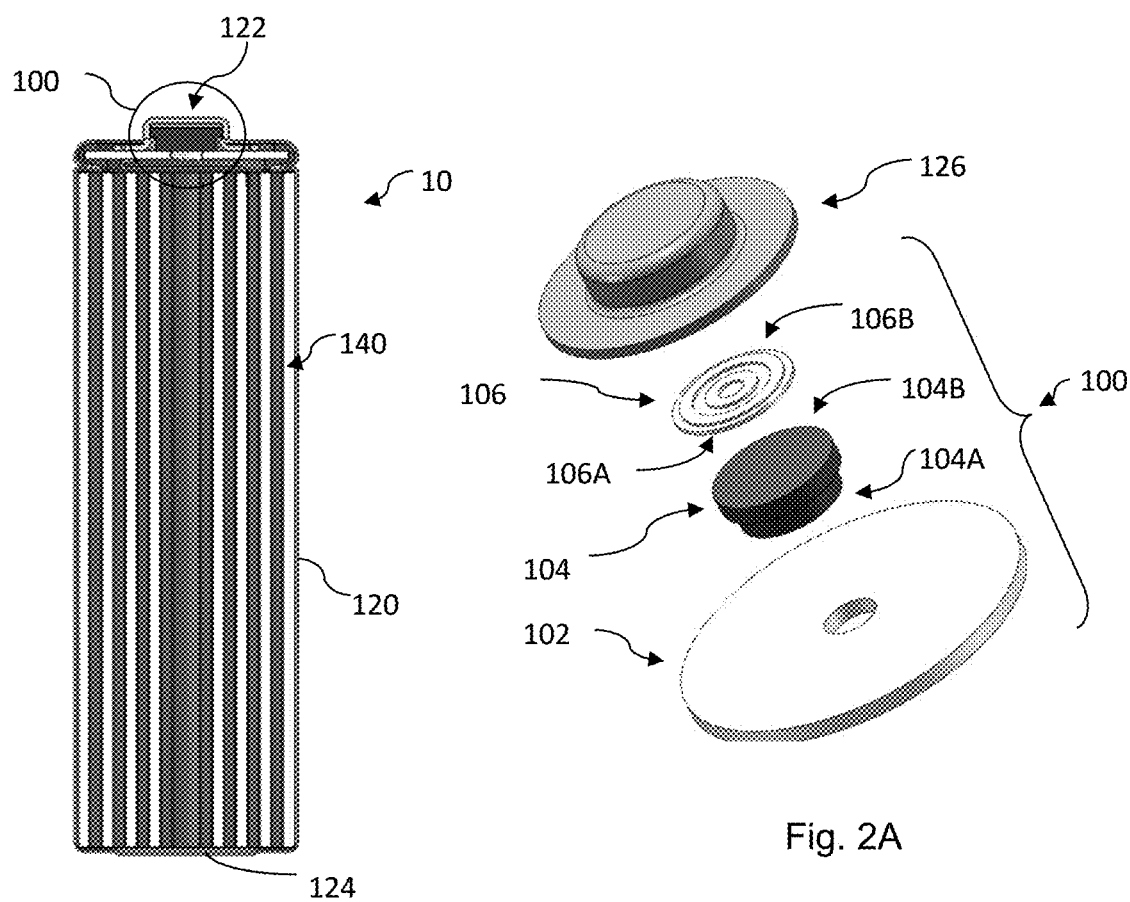

urging member (106) is to permanently deform on reaching a venting threshold temperature such that gas venting from the battery chamber will occur at a pressure below the venting threshold pressure.

6 Claims, 8 Drawing Sheets

(51) Int. Cl.
    *H01M 2/04*     (2006.01)
    *H01M 2/34*     (2006.01)
    *H01M 10/052*     (2010.01)

(52) U.S. Cl.
    CPC ....... *H01M 2/0413* (2013.01); *H01M 2/1235* (2013.01); *H01M 2/1264* (2013.01); *H01M 2/34* (2013.01); *H01M 10/052* (2013.01); *H01M 2200/106* (2013.01); *H01M 2200/20* (2013.01)

(58) Field of Classification Search
    USPC .......................................................... 429/82
    See application file for complete search history.

(56) References Cited

U.S. PATENT DOCUMENTS

| | | |
|---|---|---|
| 4,943,497 A | 7/1990 | Oishi et al. |
| 5,418,082 A | 5/1995 | Taki et al. |
| 5,750,277 A | 5/1998 | Vu et al. |
| 7,186,477 B2 | 3/2007 | Lei |
| 2008/0220321 A1* | 9/2008 | Yonemochi ........... H01M 2/105 429/89 |

FOREIGN PATENT DOCUMENTS

| | | | |
|---|---|---|---|
| JP | H06325742 A | | 11/1994 |
| JP | 2005347130 A | * | 12/2005 |
| JP | 2005347130 A | | 12/2005 |

OTHER PUBLICATIONS

Extended European Search Report of counterpart European Patent Application No. 15851084.2 dated Feb. 13, 2018.

* cited by examiner

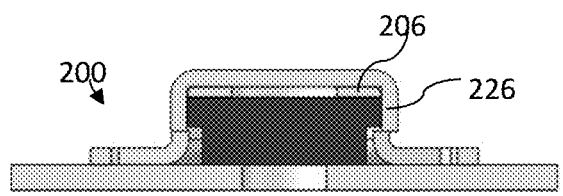
Fig. 3B
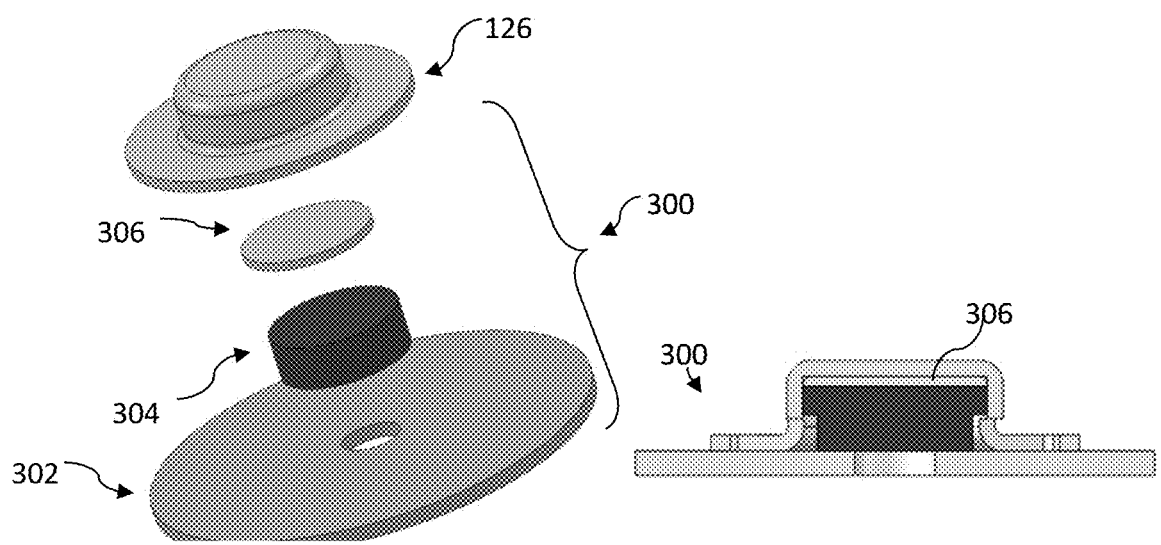
Fig. 4A
Fig. 4B
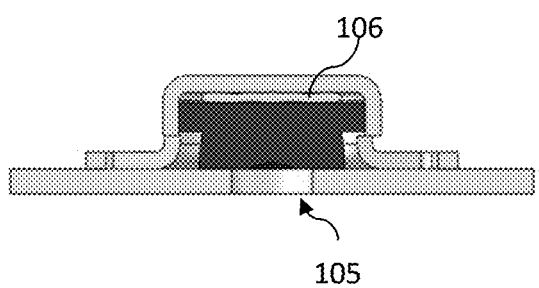
Fig. 5A
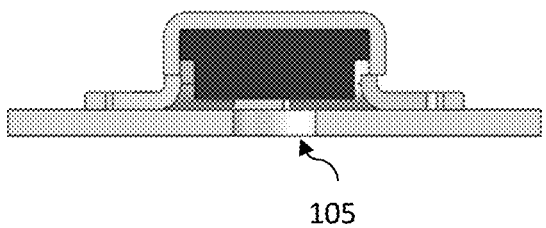
Fig. 5B

BATTERY INCLUDING SAFETY VENT ASSEMBLY

FIELD

The present invention relates to batteries, and batteries having a safety device, and more particularly to rechargeable batteries having a safety vent assembly.

BACKGROUND

Batteries are a stored energy source that has many useful and practical applications. When stored energy is released from a battery, an energy conversion process known as discharging will take place. When energy is re-loaded to a battery after discharging, an energy conversion process known as charging will take place. During charging and discharging, heat and gas are generated in a relatively confined volume. While batteries are a relatively safe, reliable and portable stored energy source, the heat and pressure generated during charging and discharging, and especially during rapid charging, rapid discharging, faulty charging or faulty discharging, the heat and pressure generated can be problematic and may lead to explosion in extreme conditions.

With the increasing demand for batteries having higher energy storage capacities so that battery-driven vehicles ("EV") and battery driven apparatus such as mobile phones and portable computers can have longer operation duration before requiring recharging, the risk of "thermal runaway" in batteries also increases. Thermal runaway in batteries is undesirable and is typically accompanied by venting of combustible vapours, smokes, sparks and flame and is a safety concern for modern day battery operation.

Batteries having safety arrangements to prevent thermal runaway and to mitigate explosion risks are known. Example of such battery safety arrangements includes pressure-triggered devices such as safety vents and current-triggered devices such as fuses.

Sealed batteries having an over-pressure current interruption arrangement have been described in U.S. Pat. No. 5,418,082 & U.S. Pat. No. 4,943,497. In such batteries, current connection between an electrode and a battery terminal is by a welded assembly. When the internal pressure of a battery reaches a predetermined threshold, a safety member operates to break the welded connection to terminate battery reaction.

Batteries having another type of over-pressure current interrupting arrangement are also taught in U.S. Pat. No. 5,750,277. In this arrangement, current connection between an electrode and a terminal is formed by a resilient conductive member urging against another conductive member. When the internal battery internal pressure reaches a predetermined threshold, a safety member is deformed and operates to break the current connection, thereby interrupting current connection of the battery.

A lithium rechargeable battery described in U.S. Pat. No. 7,186,477 has an over-pressure protection header comprising a rupture disc (31) which is riveted with an annular weld plate (33) to form the current connection. When the internal pressure of the battery exceeds a threshold, the rupture disc will be popped up to break the current connection.

Known battery safety devices arrangements are not quite satisfactory. For example, in the welded type arrangement first mentioned above, a very high internal pressure is required to break the welded connection and therefore the current connection, since a large welded area is usually required to achieve a very low resistance. In the spring urged arrangement, the contact resistance can be variable and non-consistent during the life of a battery, and a battery incorporating such an arrangement would not perform well until a vibration test, which is required when a battery is to be put on the consumer market. In the riveted type arrangement of U.S. Pat. No. 7,186,477, a very high internal pressure is required to pop up the rupture disc if the contact resistance between the rupture disc and the annular weld plate is to be low.

SUMMARY OF DISCLOSURE

There is disclosed a battery comprising a reaction chamber and a safety vent assembly. The safety vent assembly comprises a sealing member and an urging member to urge the sealing member against a venting aperture on the battery reaction chamber to seal the battery reaction chamber when under normal operation conditions. The urging member is to soften or deform on reaching a threshold venting temperature. When the urging member is so softened or so deformed during fail-safe operations, pressure inside the reaction chamber will overcome the compressive closure force of the urging member and a venting path will be opened so that gases from the reaction chamber can pass or escape from the reaction chamber to outside though the venting aperture to reduce pressure inside the reaction chamber. In general, when pressure inside the battery chamber reaches a venting threshold pressure which is sufficient to overcome the urging force of the sealing member, the battery temperature will also be at a safety threshold temperature and fail-safe operations are warranted. During fail-safe operations, the urging member is to permanently deform on reaching a venting threshold temperature and gas venting from the battery chamber will occur at a pressure below the venting threshold pressure.

The urging member and the sealing member are in urging abutment during normal battery operations and during fail-safe operations.

The urging member and the sealing member may be made of different materials or materials (whether same or different) having different physical properties. For example, the urging material may be made of a resilient material the resilience of which is more sensitive to temperature change, especially at temperatures near the threshold venting temperature or fail-safe threshold temperature. For example, the urging member may be porous and air permeable or has a higher porosity than the non-porous or non-air permeable sealing member. On the other hand, the sealing member may have a substantially higher melting point or a melting point at a substantially higher temperature that the fail-safe threshold temperature so that the sealing member will not prematurely melt to glue the venting aperture.

The urging member is made to have a fill ratio or occupation ratio which is less than 100%. The occupation or fill ratio is the volume ratio between the volume occupied by materials forming the urging member and the external volume defined by the external or outer dimensions of the urging member. The external volume also defines a buffer volume inside the battery housing which extends between the axial ends of the urging member. Example fill ratio may be in the range of 60-95% or 75-85%. For example, the fill ratio may be higher than 50%, 55%, 60%, 65%, 75%, 80%, 85% or lower than 95%, 90%, 85%, 80%, 75%, 70%, 65% or any combination thereof.

In some embodiments, the urging member may comprise distributed protrusions on an axial end surface which is contact with the battery housing. The distributed protrusions facilitates more rapid heat induced deformation and hence more rapid opening up of the venting path. The protrusions may be distributed to provide more even and distributed support to provide a more evenly distributed compressive urging force while achieving a good thermal responsive time.

The sealing member may have an outer periphery larger than that of the urging member so as to at least partially enclose or wrap the urging member, or vice versa.

FIGURES

Figure 2B:
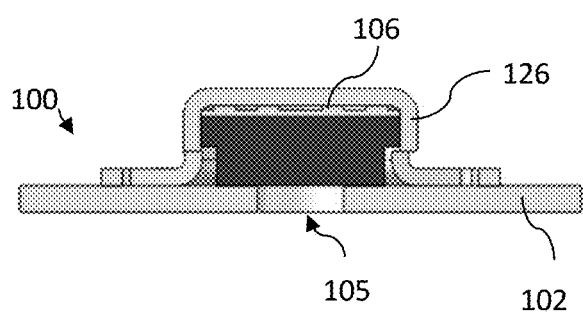
Figure 3A:
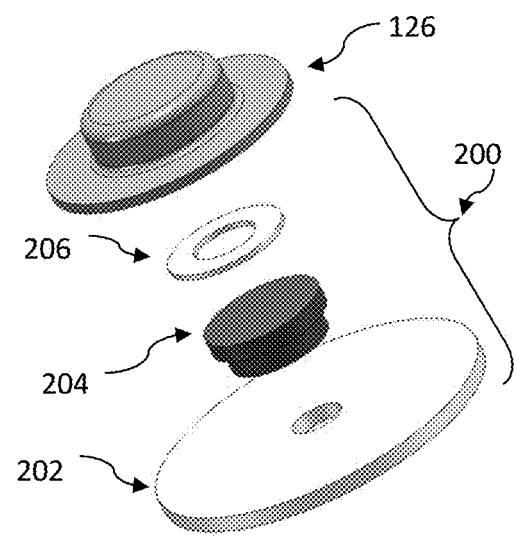
Figures 6A, 6B:
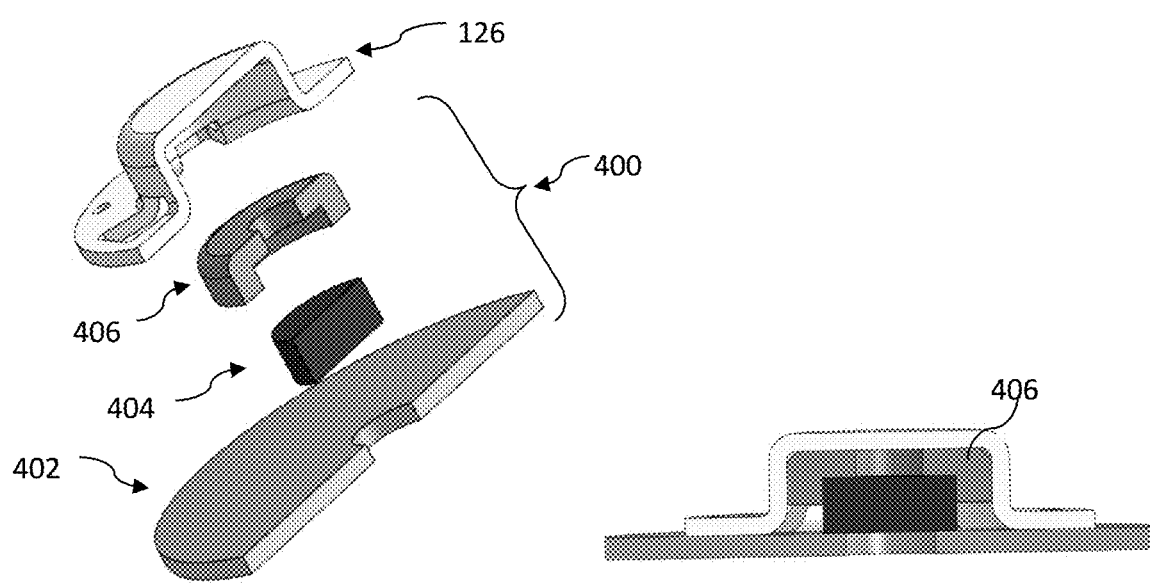
Figures 7A, 7B:
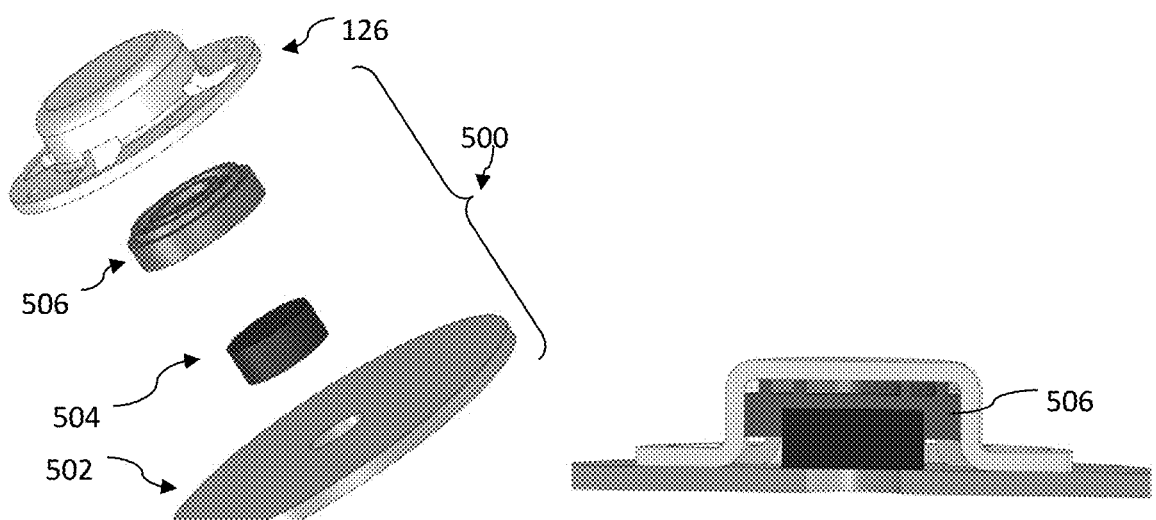
Figure 8:
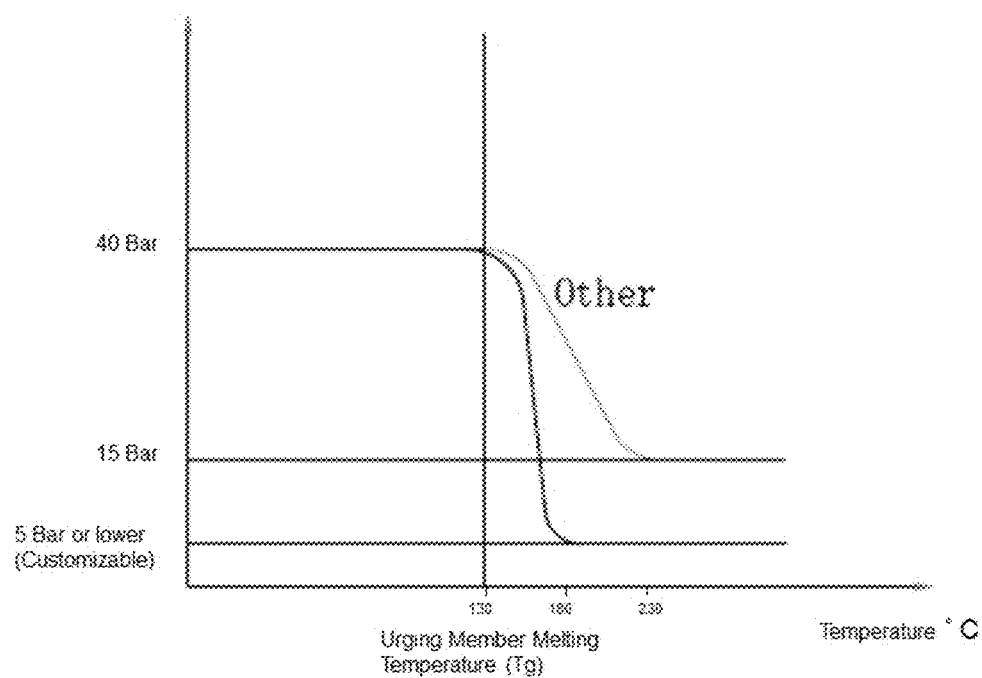
Figure 9:
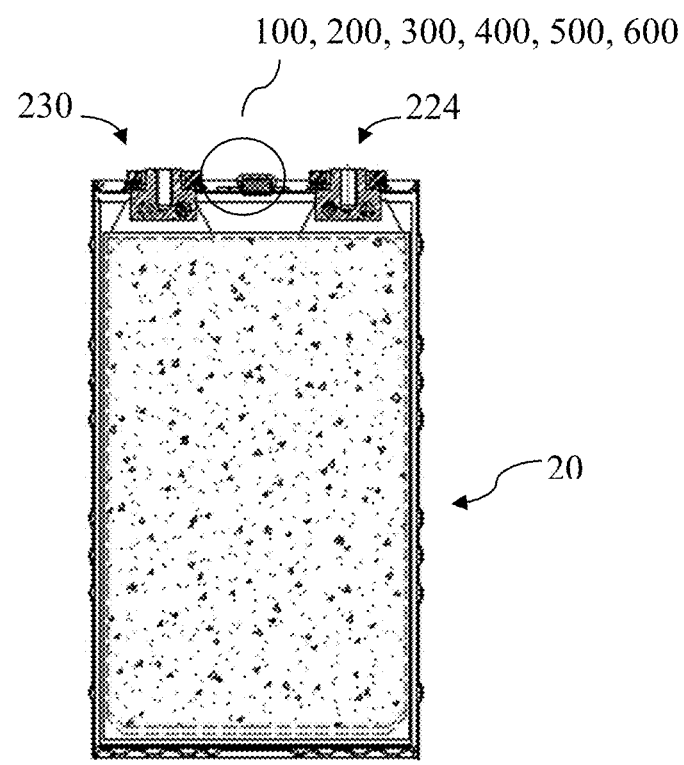
Figure 10A:
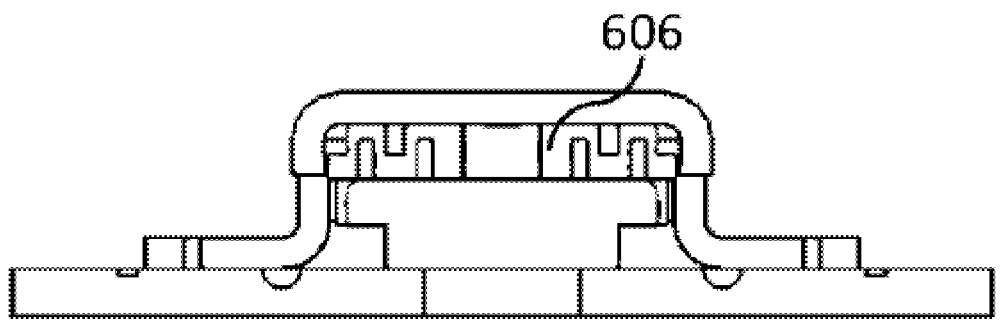
Figure 10B:
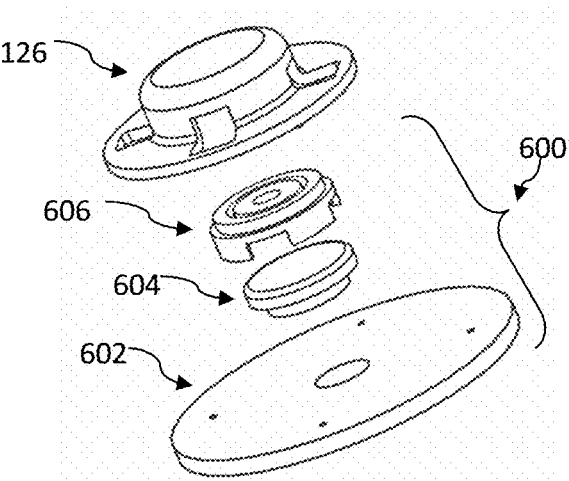
Figures 11A, 11B, 11C:
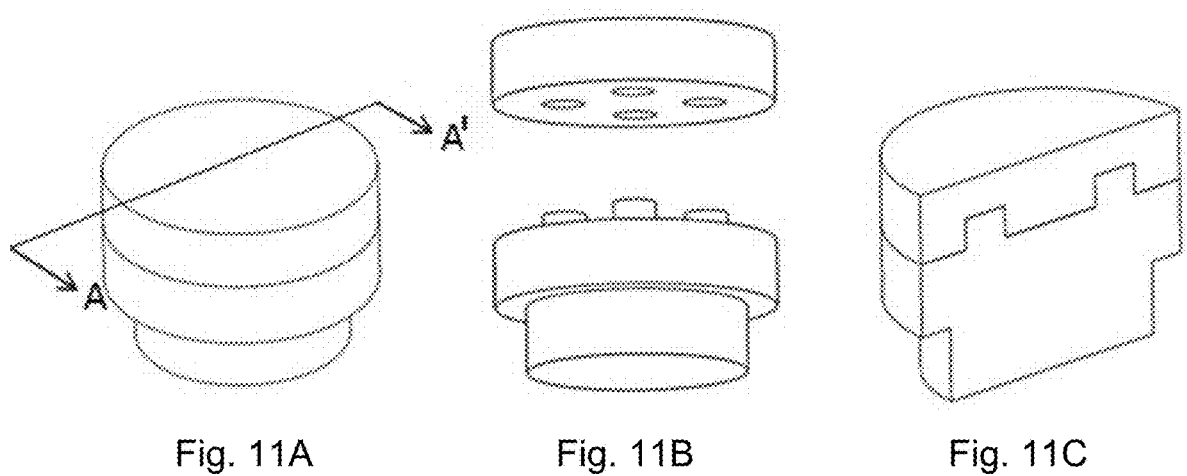
Figure 14A:
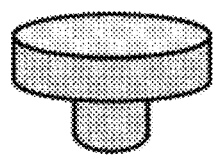
Figure 14B:
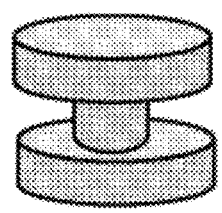

The present disclosure will be described by way of example and with reference to the accompanying figures, in which:

FIG. 1 is a longitudinal cross-sectional view of an example battery according to the disclosure, FIG. 2A is an exploded view showing components of an example safety venting assembly of a battery according to the disclosure, FIG. 2B is a cross-sectional view showing the example safety venting assembly comprising the components of FIG. 2A in assembled form during normal operation conditions, FIG. 3A is an exploded view showing components of an example safety venting assembly according to the disclosure, FIG. 3B is a cross-sectional view showing the example safety venting assembly comprising the components of FIG. 3A in assembled form during normal operation conditions, FIG. 4A is an exploded view showing components of an example safety venting assembly according to the disclosure, FIG. 4B is a cross-sectional view showing the example safety venting assembly comprising the components of FIG. 4A in assembled form during normal operation conditions, FIG. 5A is a schematic diagram depicting a transitional state of the safety venting assembly of FIG. 2B during fail-safe operations, FIG. 5B is a schematic diagram depicting venting operations of the safety venting assembly of FIG. 2B upon entering into a fail-safe state, FIG. 6A is an exploded view showing components of an example safety venting assembly according to the disclosure, FIG. 6B is a cross-sectional view of the example safety venting assembly of FIG. 6A in assembled form during normal operation conditions, FIG. 7A is an exploded view showing components of an example safety venting assembly according to the disclosure, FIG. 7B is a cross-sectional view of the example safety venting assembly of FIG. 7A in assembled form during normal operation conditions, FIG. 8 is a diagram depicting schematically relationship between operational temperature and pressure of an example battery according to the disclosure, FIG. 9 shows another example battery according to the present disclosure, FIG. 10A is a cross sectional view of an example venting assembly according to the disclosure, FIG. 10B is an exploded view showing components of the example venting assembly of FIG. 10A, FIG. 11A is a perspective view showing an example safety valve sub-assembly, FIG. 11B is an exploded view showing components of the example safety valve sub-assembly of FIG. 11A, FIG. 11O is a longitudinal cross-sectional view taken along line A-A' in FIG. 11A, FIGS. 12A to 12C are schematic views showing example safety valve sub-assemblies according to the disclosure, FIGS. 13A to 13E are perspective views of example sealing members, and FIGS. 14A and 14B are perspective views of further example sealing members.

DESCRIPTION

An example rechargeable battery 10 depicted in FIG. 1 comprises an electrode plate group ("EPG") which is contained inside a battery housing. In this example, the battery housing is a steel can 120 which is filled with a battery electrolyte (not shown). A safety venting assembly 100 is mounted on top of the battery housing and below a top battery terminal. The electrode plate group 140 comprises a positive electrode plate group which is connected to a positive battery terminal 122 via a positive current collector, a negative electrode plate group which is connected to a negative battery terminal 124 via a negative current collector, and an insulating separator group providing insulation between the positive and negative electrode plate groups. The battery housing defines a reaction chamber inside which the electrode plate group 140 is immersed in battery electrolyte and a top cap portion. The safety venting assembly 100 is to cooperate with a top cap portion 126 of the battery housing and urges downwardly against a top venting aperture of the steel can 120 to seal the reaction chamber so that the battery electrolyte is retained during storage or normal operations and a fail-safe venting path is provided when pressure inside the reaction chamber exceeds a safety pressure limit or an operational pressure limit.

The example battery is a cylindrical battery 10 in which a coiled electrode plate group 140 having a generally cylindrical shape is immersed in an electrolyte contained inside a battery housing having a generally cylindrical shape. The generally cylindrically shaped battery housing comprises a steel can 120 defining a generally cylindrical shaped internal compartment inside which the coiled electrode plate group and the electrolyte are housed, a top cap portion on the cylindrical steel can 120 and a safety assembly 100 between the top cap portion and the cylindrical steel can 120. The positive current collector is connected to a conductive portion of the top cap portion which is in turn connected to the positive battery terminal. The negative current connector is connected to the steel can and the steel can body defines a distributed negative terminal. The safety assembly is to cooperate with the steel can 120 to define a sealed reaction chamber inside which energy conversion processes are to take place during normal battery operations. The top cap portion is to cooperate with the safety assembly to define a buffer region in which the safety assembly is to operate when conditions of the battery is outside safety or operation limits.

The safety assembly 100 comprises a sealing member which extends transversely across the steel can to partition the battery housing into a first region defining a sealed reaction chamber and a second region above the first region. The second region defines a buffer compartment and a buffer region.

An example safety assembly 100 depicted in FIG. 2A comprises a partitioning member 102, a sealing member 104 and an urging member 106. The partitioning member is in the form of a partitioning plate having a venting aperture 105 defined at its centre. The partitioning member 102 has a circular cross-section to follow the circular shape of the steel can 120. The partitioning plate is non-gas permeable and is in a circular shape to correspond to the shape and size of the internal compartment defined by the cylindrical steel can 120 of the battery housing to facilitate sealing of the reaction chamber when the sealing member is in a sealing position during normal battery operation conditions. In some embodiments, a circumferential groove is formed on the interior of the battery housing to hold the partitioning plate in place at an axial level above the bottom of the steel can 120 or at an axial distance above the maximum electrolyte level. The venting aperture 105 on the partitioning member 102 is to provide a passageway through which excessive gases built-up in the reaction chamber can be released when the safety mechanism is activated under adverse battery conditions. The size of the venting aperture is determined according to various factors, including the rating of the battery, the size of the reaction chamber, rate of gaseous by-product generation when outside the normal operation conditions, and/or the required speed of gas release or pressure reduction.

The sealing member 104 is to seal the venting aperture during normal battery operation conditions when the sealing member is under an axial urging force to urge against the venting aperture. The example sealing member 104 shown in FIGS. 2A and 2B comprises a resilient main body having a first axial end portion 104A having a first sealing surface which faces the venting aperture and a second axial end portion 104B having a second sealing surface which faces the urging member 106, the first and second axial end portions being axially aligned and opposite facing. The first axial end portion 104A of the sealing member 104 is in urging or pressing abutment with the partitioning member 102 and extends across the entire venting aperture to cover and/or seal the venting aperture during normal battery operation conditions. The second end portion of the sealing member is in urging or pressing abutment with the urging member and to transmit an axial urging force coming from the urging member to the first end portion. An example resilient main body of an example sealing member is formed of a resilient material such as a resilient rubber including EPDM rubber, synthetic rubber including silicone rubber and natural rubber.

The urging member 106 is to apply an axial force to urge the sealing member against the venting aperture to seal the venting aperture during normal battery operation conditions. The example urging member 106 of FIG. 2B comprises a resilient main body having a first end portion 106A having an urging surface which faces the sealing member and a second end portion 106B having a second urging surface which faces the top cap portion 126, the first and second end portions being axially aligned and opposite facing. The first end portion 106A of the urging member 106 is in urging or pressing abutment with the sealing member and the second end portion 106B of the urging member is in urging or pressing abutment with the top cap portion. During normal operations, a resilience or compressive urging force stored inside the resilient main body of the urging member 106 is to act as an axial urging force against the sealing member 104 to seal the venting aperture 105 and to keep the reaction chamber gas tight.

The urging member 106 has an axial extent or axial thickness and occupies a buffer volume. The buffer volume is defined by a buffer compartment which dis in turn defined between the top cap portion and the sealing member 104. In general, the buffer volume is defined by the axial thickness and transversal extent of the main body, and it has an occupation ratio or a fill ratio of or below 100%. The occupation or fill ratio is the volume ratio between the volume of solid materials inside the buffer volume and the buffer volume. In general, the buffer volume inside the battery housing extends between the axial ends of the urging member and the total volume occupied by or filled with materials of the urging member. The ratio is preferably in the range of 60-95% and more preferably in the range of 75-85%. An example resilient main body of an example urging member is formed of a resilient material such as a resilient thermo-plastic material including polypropylene, nylon, polyethylene and the like.

In the example of FIG. 2A, the urging member 106 is moulded of rubber and has a solid base portion on which alternate concentric protrusions and indentations are integrally formed.

The example safety assembly 200 depicted in FIG. 3A comprises a partitioning member 202, a sealing member 204 and an urging member 206. The arrangements of the components are substantially the same as that of example safety assembly 100 and the description on the example safety assembly 100 is incorporated herein by reference with numerals increased by 100 where the numerals relate to the same or functionally equivalent components. In the example of FIGS. 3A and 3B, the urging member is different to that of FIGS. 1A and 2A and is in the shape of a washer having a hollow central portion surrounded by a solid rim of rubber.

The example safety assembly 300 depicted in FIG. 4A comprises a partitioning member 302, a sealing member 304 and an urging member 306. The arrangements of the components are substantially the same as that of example safety assembly 100 and the description on the example safety assembly 100 is incorporated herein by reference with numerals increased by 200 where the numerals relate to the same or functionally equivalent components. In the example of FIGS. 4A and 4B, the urging member is different to that of FIGS. 1A to 3A and is in the shape of a solid pellet formed of rubber and has a cross-sectional extent smaller than the corresponding cross-sectional area of the battery housing at the axial level at which the urging member is located.

In some embodiments, the top cap portion is in the form of a grille-shaped open structure and the urging member is in the shape of a solid pellet formed of rubber and has a 100% occupation ratio of the battery housing at the axial level at which the urging member is located.

In some embodiments, the urging member is formed of heat shrinkable material which is to shrink at a predetermined threshold temperature. The heat shrinkable material may a thermoplastic material such as polyolefin, fluoropolymer (such as FEP, PTFE or Kynar), PVC, neoprene, silicone elastomer or Viton.

In some embodiments, the material forming the urging material has a substantially lower melting point than that of the material forming the sealing member so that when the battery temperature rises to above an a predetermined threshold temperature indicating abnormal operation, the urging member will be softened or melted and the sealing member will be pushed upwards towards the top cap portion to open up a venting path by the internal pressure of the reaction chamber. Excessive gas inside the reaction chamber will be released through the venting path to reduce pressure inside the battery housing.

In some embodiments, the urging member and the sealing member may be formed as a single piece.

The example safety assembly 400 depicted in FIG. 6A comprises a partitioning member 402, a sealing member 404 and an urging member 406. The arrangements of the components are substantially the same as that of example safety assembly 100 and the description on the example safety assembly 100 is incorporated herein by reference with numerals increased by 300 where the numerals relate to the same or functionally equivalent components. In the example of FIGS. 6A and 6B, the urging member 406 is moulded into the shape of a circular cap having a base portion and a peripheral wall surrounding a base portion to define a recess or an indentation. The sealing member 404 has a head portion having a shape and dimension complementary to the recess portion of the urging member. The urging member and the sealing member are formed as a single piece by over-moulding with the head portion of the sealing member received inside the recess of the urging portion in a closely fitted manner by over-moulding. In some embodiments, the recess extends through the base portion to define a through aperture extending axially through the urging member.

The example safety assembly 500 depicted in FIG. 7A comprises a partitioning member 502, a sealing member 504 and an urging member 506. The arrangements of the components are substantially the same as that of example safety assembly 400 and the description on the example safety assembly 400 is incorporated herein by reference with numerals increased by 100 where the numerals relate to the same or functionally equivalent components. In the example of FIGS. 7A and 7B, the urging member 506 is moulded into the shape of a circular cap having a base portion and a peripheral wall surrounding a base portion to define a recess or an indentation. The sealing member 504 has a head portion having a shape and dimension complementary to the recess portion of the urging member. The urging member and the sealing member are formed as a single piece by over-moulding with the head portion of the sealing member received inside the recess of the urging portion in a closely fitted manner by over-moulding. A plurality of concentric ribs is formed on an axial end of the base portion distal from the sealing member. The concentric ribs projecting axially from the base portion in an axial direction away from the sealing member to define a plurality of concentric grooves.

An example safety or venting assembly 600 depicted in FIG. 10A is part of a battery. The battery comprises an electrode plate group which is housed inside a battery housing. The electrode plate group is immersed inside a battery electrolyte which is contained inside an electrolyte container defined by the battery housing. A reaction chamber which is cooperatively formed by the electrode plate group, the battery electrolyte and the electrolyte container is sealed by the venting assembly 600 in cooperation with a top end cap portion of the battery housing.

The example safety or venting assembly 600 comprises a partitioning member or plate 602, a sealing member 604 and an urging member 606, as depicted in FIG. 10B. The arrangements of the components are substantially the same as that of example safety assembly 400/500 and the description on the example safety assembly 400/500 is incorporated herein by reference with numerals increased by 200/100, wherein like numerals represent like components.

In the example safety venting assembly of FIGS. 10A and 10B, the urging member 606 and the sealing member 604 cooperate to form a valve sub-assembly. The urging member 606 is formed of a heat melt-able or heat deformable material which is rigid during normal working temperature of the battery and which is to melt or soften to deform when a threshold venting temperature is reached. The urging member 606 includes an upper portion which extends transversely in a radial direction to form a ceiling portion and a skirt portion which is formed on the outer periphery of the ceiling portion and which projects axially downwards and away from the ceiling portion. The skirt portion includes indentations which are distributed along its perimeter to define a plurality of retention teeth. The retention teeth are distributed along periphery of urging member and project axially downwards to define a retention compartment inside which the sealing member 604 is securely seated or tightly received.

In some embodiments, the urging member includes an indentation or a plurality of indentations, for example, on the upper portion so that materials forming the urging member can flow into the indentation to reduce axial thickness of the urging member to provide room for operatively movement of the sealing member when the venting temperature has reached, For example, an arcuate groove or a plurality of arcuate grooves is formed on the upper portion to provide room from deformation flow.

In some embodiments, the urging member 606 is moulded of hard thermal plastics, for example, polyethylene. Where the urging member 606 is moulded of hard thermal plastics, resilience of the retention teeth will cooperate to exert a radial compression force to keep the sealing member 604 inside the retention compartment or sealing member 604 receptacle defined by the plurality of retention teeth. In such embodiments, the urging member 606 forms a clasp to firmly hold the sealing member 604 inside the retention compartment.

The urging member 606 is made of a material having a substantially lower melting or softening temperature so that it will melt or softens while the sealing member 604 is substantially un-deformed so that the sealing member 604 would not interfere with or fill the venting aperture on the partitioning member or plate 602 when the venting temperature is reached. For example, where the venting temperature is set at 130° C. as depicted in FIG. 8, the urging member 606 will deform when the temperature of the battery has reached 130° C. while the sealing member will remain un-deformed or substantially un-deformed. When temperature trigger deformation occurs at the urging member, pressure inside the reaction chamber will push the sealing member to move away from the venting aperture to provide a venting path to relieve internal pressure.

In some embodiments, the urging member 606 is moulded into the shape of a circular cap having a base portion and a peripheral wall surrounding a base portion to define a recess or an indentation. In some embodiments, the peripheral wall might comprise a plurality notches being evenly or non-evenly spaced apart from each other on the periphery of the circular cap or about the central axis of the circular cap. The sealing member 604 has a head portion having a shape and dimension complementary to the recess portion of the urging member. In the present embodiment, the recess extends through the base portion to define a through aperture extending axially through the urging member. The urging member and the sealing member might be formed as a single piece by over-moulding with the head portion of the sealing member received inside the recess of the urging portion in a closely fitted manner by over-moulding. A plurality of concentric ribs is formed on an axial end of the base portion distal from the sealing member. The concentric ribs projecting axially from the base portion in an axial direction away from the sealing member to define a plurality of concentric grooves.

Similarly, a plurality of concentric ribs and/or a couple of protrusions might be formed on an axial end of the head portion of the sealing member proximate to the urging member. The concentric ribs and/or the couple of protrusions projecting axially from the head portion in an axial direction towards the urging member to complement or engage with same or functionally equivalent contact plane or portions such as recesses arranged at the urging member.

In some embodiments, the sealing member might be a profiled member rather than a cylindrical member. For example, at least a portion (e.g. an upper portion, a lower portion, and/or an intermediate portion) of the sealing member might be of any regular shapes, such as triangular, square, rectangular, polygonal, star-like, cross-like, or the like, as shown in FIGS. 13A-13E. In some embodiments, the sealing member might be a profiled member (a member in various forms and dimensions) having a I-shaped or T-shaped cross-sectional profile, as shown in FIGS. 14A-14B.

Figure 12A:
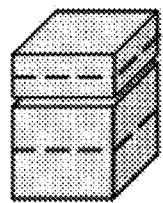

In some embodiments, the urging member and the sealing member might be simply stacked together, or they could be welded, glued or bonded so as to form a sandwich like structure in case that either of both of the urging member and the sealing member being in form of a multi-layered member made of same or various materials, as shown in FIG. 12A. The dash lines are used to indicate that the urging member and the sealing member might comprise multiple layers of same or different materials.

In some embodiments, the urging member and the sealing member might comprise complementary portions for engagement and might be joined together by interlocking joint, dowel joint, mechanical joint such as bolted joint, screw joint, welded joint, etc., or any other means well known in the art, as shown in FIGS. 11A-11C.

Figure 12B:
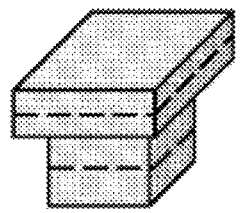
Figure 12C:
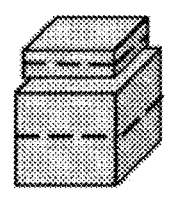
Figure 13A:
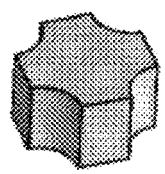
Figure 13B:
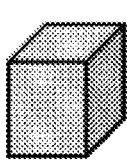
Figure 13C:
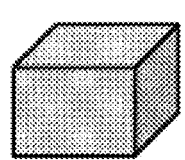
Figure 13D:
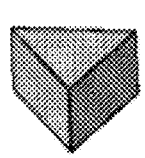
Figure 13E:
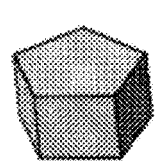

In some embodiments, the urging member and the sealing member might be of same size or dimension. Alternatively, the sealing member might be substantially larger/smaller than the urging member, or vice versa, as shown in FIGS. 12B-12C. In other words, the sealing member might be at least partially enclosed or wrapped by the urging member as shown in foregoing embodiments. Alternatively, the urging member might be in turn at least partially enclosed or wrapped by the sealing member depending on the actual design and requirements of a specific application.

The sealing member may have different shapes and dimensions, as depicted in FIGS. 13A to 13E. In general, regardless of the shape and dimension, each sealing member has a central portion having a foot print sufficient to cover the venting aperture during storage or normal operations.

While the sealing members depicted in FIGS. 13A to 13E are substantially prismatic, it should be appreciated that the sealing members need not be prismatic and may have non-uniform cross section along its axial or longitudinal direction.

As depicted in the example of FIGS. 14A and 14B, the sealing member may have a T- or I-shaped profiled along its length.

The melting or softening temperature of the urging member and the sealing member may be selected according to operational environmental requirements. Examples of temperature ranges are set out in Table 1 below:

TABLE 1

| | Urging Member Melting Temperature (Tg) | Sealing Member Melting Temperature (Tg) |
| --- | --- | --- |
| Low temperature series | 50-100, or 50-150° C. | 300 or 301-500° C. |
| Normal temperature series | 100-200° C. | 300 or 301-500° C. |

TABLE 1-continued

| | Urging Member Melting Temperature (Tg) | Sealing Member Melting Temperature (Tg) |
| --- | --- | --- |
| High temperature series | 150-250° C. | 300 or 301-500° C. |
| Ultra high temperature series | 200-300° C. | 300 or 301-500° C. |

In operation, energy conversion taking place in the reaction chamber will generate heat and gases. When the heat generated by the reaction chamber exceeds a threshold temperature corresponding to a predetermined limit, the resilient urging member 106, 206, 306, 406, 506 will soften and melt. As a result of the softening and/or melting of the urging member, the urging member will be deformed to spread the space inside the battery housing which was originally partially occupied by the material of the urging member, as depicted in FIG. 5A. When this happens, the axial extent occupied by the urging member will be reduced and the internal pressure inside the reaction chamber will push the deformed urging member towards the top cap portion 226. As a result a venting path to relieve internal pressure is built up and pressure inside the reaction chamber will be reduced without interrupting operation of the battery.

As depicted in FIG. 8, the internal pressure of the battery having a heat triggered venting assembly is well reduced before the temperature rises to an unacceptable level, compared to conventional pressure triggered venting arrangements.

An example prismatic battery 20 depicted in FIG. 9 comprises an electrode plate group ("EPG") which is contained inside a battery housing and filled with an electrolyte (not shown) and a safety venting assembly. The electrode plate group comprises a positive electrode plate group which is connected to a positive battery terminal via a positive current collector, a negative electrode plate group which is connected to a negative battery terminal via a negative current collector, and an insulating separator group providing insulation between the positive and negative electrode plate groups. The battery 20 have similar structural features as that of battery 10 except that the battery housing is prismatic, and both positive and negative battery terminals 224, 230 are mounted on a common partitioning plate on which the safety assembly 100, 200, 300, 400, 500, 600 are mounted.

In some embodiments, the example cylindrical battery 10 is a NiMH (Nickel Metal Hydride) battery having a positive electrode formed of nickel hydroxide, a negative electrode formed of hydrogen absorbing alloy, a separator and a strong alkaline electrolyte such as KOH, NaOH and LiOH. The separator may for example be formed of non-woven polypropylene (PP).

In some embodiments, the battery 10, 20 is a lithium-ion battery which is filled with a non-aqueous electrolyte. in lithium-ion, batteries, lithium transitional metal oxides, for example, $LiCoO_2$ and $LiMnO_4$, are suitable materials for use as the cathode or positive electrode material, while many carbonaceous compounds, for example, coke and non-graphitizing hard carbon, are suitable for use as the anode or negative terminal materials. The electrolyte is a non-aqueous electrolyte comprising, for example, $LiBF_4$ or $LiPF_6$ salts and solvent mixtures known to persons skilled in the art.

While the disclosure is with reference to the above examples, it should be appreciated that the examples are for illustration only and should not be used to limit the scope of disclosure.

TABLE OF NUMERALS

| 10, 20 | Battery | 100, 200, 300, 400, 500, 600 | Venting/safety assembly |
|---|---|---|---|
| 120 | Battery can | 102, 202, 302, 402, 502, 602 | Partitioning member/plate |
| 122 | Positive battery terminal | 104, 204, 304, 404, 504, 604 | Sealing member |
| 124 | negative battery terminal | 106, 206, 306, 406, 506, 606 | Urging member |
| 126 | Battery top cap end portion | | |

The invention claimed is:

1. A battery comprising:
a battery housing;
a top cap;
a reaction chamber within the battery housing having a venting aperture;
a safety vent assembly including:
a resilient sealing member having a first shape;
a polymeric urging member having an upper portion extending transversely in a radial direction and a skirt portion formed on an outer periphery of the upper portion and projecting axially downward, the skirt portion including indentations distributed along a perimeter thereof to define a plurality of retention teeth, the polymeric urging member configured to urge the resilient sealing member against the venting aperture to seal the battery reaction chamber under normal operating conditions;
the polymeric urging member having a softening or melting temperature in a range from 50° C. to 300° C. such that the polymeric urging member is deformed to reduce an axial extent occupied by the polymeric urging member so that internal pressure inside the reaction chamber pushes the deformed polymeric urging member towards the top cap; and
the resilient sealing member has a softening or melting temperature above the softening or melting temperature of the polymeric urging member.

2. The battery according to claim 1, wherein the polymeric urging member is selected from polypropylene, nylon, or polyethylene.

3. The battery according to claim 1,
wherein the melting temperature of the polymeric urging member is between 100° C. to 200° C.

4. The battery according to claim 1,
wherein the melting temperature of the resilient sealing member is between 300° C. and 500° C.

5. The battery according to claim 1, wherein the resilient sealing member is a rubber material.

6. The battery according to claim 5,
wherein the rubber material is selected from EPDM rubber, silicone rubber, carbonized rubber or natural rubber.

* * * * *